United States Patent
O'Neil et al.

(10) Patent No.: US 11,553,003 B2
(45) Date of Patent: Jan. 10, 2023

(54) AUTOMATED SOFTWARE CAPABILITIES CLASSIFICATION MODEL THAT IDENTIFIES MULTI-USE BEHAVIOR OF NEW APPLICATIONS ON A NETWORK

(71) Applicant: Zscaler, Inc., San Jose, CA (US)

(72) Inventors: John O'Neil, Watertown, MA (US); Peter Smith, Acton, MA (US)

(73) Assignee: Zscaler, Inc., San Jose, CA (US)

( * ) Notice: Subject to any disclaimer, the term of this patent is extended or adjusted under 35 U.S.C. 154(b) by 303 days.

(21) Appl. No.: 16/896,684

(22) Filed: Jun. 9, 2020

(65) Prior Publication Data
US 2020/0387830 A1 Dec. 10, 2020

Related U.S. Application Data

(60) Provisional application No. 62/859,591, filed on Jun. 10, 2019.

(51) Int. Cl.
*G06F 15/173* (2006.01)
*H04L 9/40* (2022.01)

(52) U.S. Cl.
CPC .................... *H04L 63/20* (2013.01)

(58) Field of Classification Search
CPC ...................................... H04L 63/20
USPC ........................................ 709/224
See application file for complete search history.

(56) References Cited

U.S. PATENT DOCUMENTS

| | | | |
|---|---|---|---|
| 10,154,067 B2 | 12/2018 | Smith et al. | |
| 10,439,985 B2 | 10/2019 | O'Neil | |
| 2010/0235879 A1* | 9/2010 | Burnside | H04L 63/0263 709/224 |
| 2016/0269429 A1* | 9/2016 | Martini | H04L 63/145 |
| 2019/0149444 A1 | 5/2019 | O'Neil et al. | |
| 2019/0349283 A1 | 11/2019 | O'Neil et al. | |
| 2020/0021618 A1 | 1/2020 | Smith et al. | |
| 2020/0028820 A1 | 1/2020 | O'Neil | |
| 2020/0311600 A1* | 10/2020 | Kulkarni | G06F 8/71 |
| 2022/0038423 A1* | 2/2022 | Levin | G06N 20/00 |

FOREIGN PATENT DOCUMENTS

| | | |
|---|---|---|
| WO | 2018148058 A1 | 8/2018 |
| WO | 2018152303 A1 | 8/2018 |

* cited by examiner

*Primary Examiner* — Hee Soo Kim
(74) *Attorney, Agent, or Firm* — Clements Bernard Baratta; Lawrence A. Baratta, Jr.

(57) ABSTRACT

A computer system automatically learns which application behavior constitutes "multi-use" behavior by observing the behavior of applications on a network. The system uses this learned knowledge to automatically identify multi-use behavior in new applications that appear on the network. When the system enforces security policies against applications on the network, it identifies whether particular behavior of such applications violates any of the security policies. In this way, the system adapts automatically to new behavior of applications on the network over time in order to increase network security.

14 Claims, 3 Drawing Sheets

AUTOMATED SOFTWARE CAPABILITIES CLASSIFICATION MODEL THAT IDENTIFIES MULTI-USE BEHAVIOR OF NEW APPLICATIONS ON A NETWORK

CROSS-REFERENCE TO RELATED APPLICATIONS

This application claims priority to U.S. Provisional Patent Application No. 62/859,591, filed Jun. 10, 2019, the contents of which are incorporated by reference herein.

This application is related to the following patent applications, both of which are incorporated by reference herein:
application Ser. No. 15/883,534, filed on Jan. 30, 2018, entitled, "Network Application Security Policy Enforcement," now U.S. Pat. No. 10,154,067, issued on Dec. 11, 2018 (hereinafter "the Policy Enforcement Patent"); and
U.S. patent application Ser. No. 15/899,453, filed on Feb. 20, 2018 entitled, "Network Application Security Policy Generation," now U.S. Pat. No. 10,439,985, issued on Oct. 8, 2019 (hereinafter "the Policy Generation Patent").

BACKGROUND

For any system that automatically generates network security policies based on observed application behavior on a network, it is necessary to distinguish among different security classes of software applications. Most applications are designed to perform only one function; this makes them less likely to be used in security breaches, because they often cannot perform malicious functions. Of course, there are other applications, such as applications designed as viruses, that are known to be malicious.

There are, however, also "multi-use" applications. These applications can be used for a variety of purposes. The best examples are applications that can run arbitrary code, such as Java and Python, but there are other applications that can engage in arbitrary communications over a network. These applications are common and useful, but because there is a possibility that they could be abused, it is reasonable to take account of their potential power when creating network security policies. (If an application such as Java or Python is running an application which has been observed before and for which there policies exist, then it is the properties of that application, not Java or Python, which are relevant.)

When automating the creation of security policies, or when helping users to create security policies, it is, therefore, a best practice to take the potential for applications to be multi-use into account.

The class of "multi-use applications," however, is not a fixed list, and is not necessarily the same at all places and times. "Multi-use" is not a distinguishing feature of an application, but rather a description of its behavior. Although it is possible to create a list of multi-use applications based on someone's (or some group's) experience with that application, there is no way to guarantee that this list is complete. Even if it were complete at some time, new applications are created (or modified) constantly, and some of those new and modified applications will be multi-use. As a result, any fixed list of multi-use applications will become out-of-date, and therefore significantly less useful, quickly after it has been created.

SUMMARY

A computer system automatically learns which application behavior constitutes "multi-use" behavior by observing the behavior of applications on a network. The system uses this learned knowledge to automatically identify multi-use behavior in new applications that appear on the network. When the system enforces security policies against applications on the network, it identifies whether particular behavior of such applications violates any of the security policies. In this way, the system adapts automatically to new behavior of applications on the network over time in order to increase network security.

Other features and advantages of various aspects and embodiments of the present invention will become apparent from the following description and from the claims.

DETAILED DESCRIPTION

A computer system automatically learns which application behavior constitutes "multi-use" behavior by observing the behavior of applications on a network. The system uses this learned knowledge to automatically identify multi-use behavior in new applications that appear on the network. When the system enforces security policies against applications on the network, it identifies whether particular behavior of such applications violates any of the security policies. In this way, the system adapts automatically to new behavior of applications on the network over time in order to increase network security.

As described in the Policy Enforcement Patent and the Policy Generation Patent, information may be collected automatically about applications executing on a network, and network security policies may be generated automatically based on the collected information. Such policies may then be enforced at the application and host level within the network. As will be described in more detail below, embodiments of the present invention may automatically identify applications that have multi-use behavior and then enforce appropriate network application security policies against such automatically-identified multi-use applications.

Figure 1A:
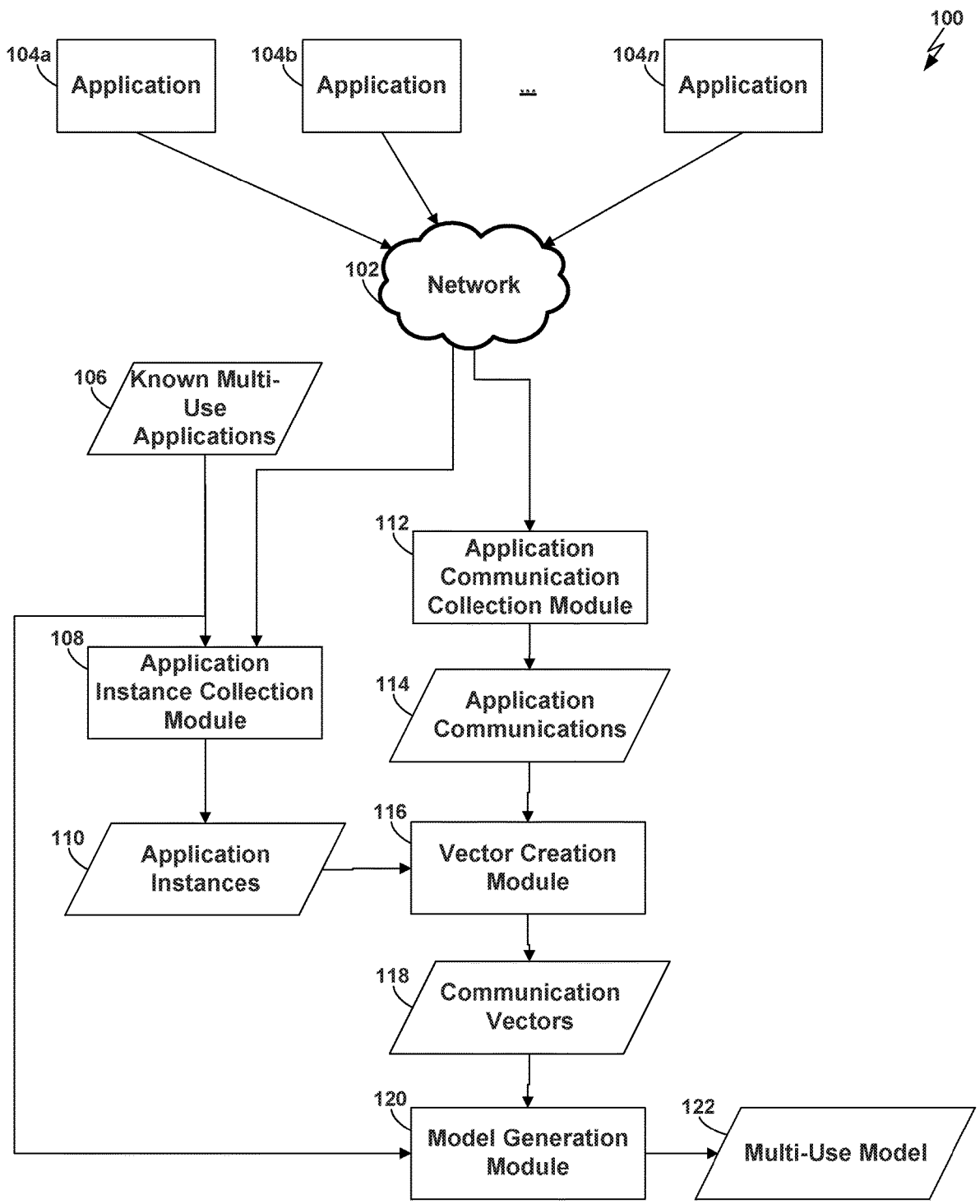
FIG. 1A is a dataflow diagram of a system for automatically generating a model that predicts whether applications on a network are multi-use or single use according to one embodiment of the present invention.
Figure 2:
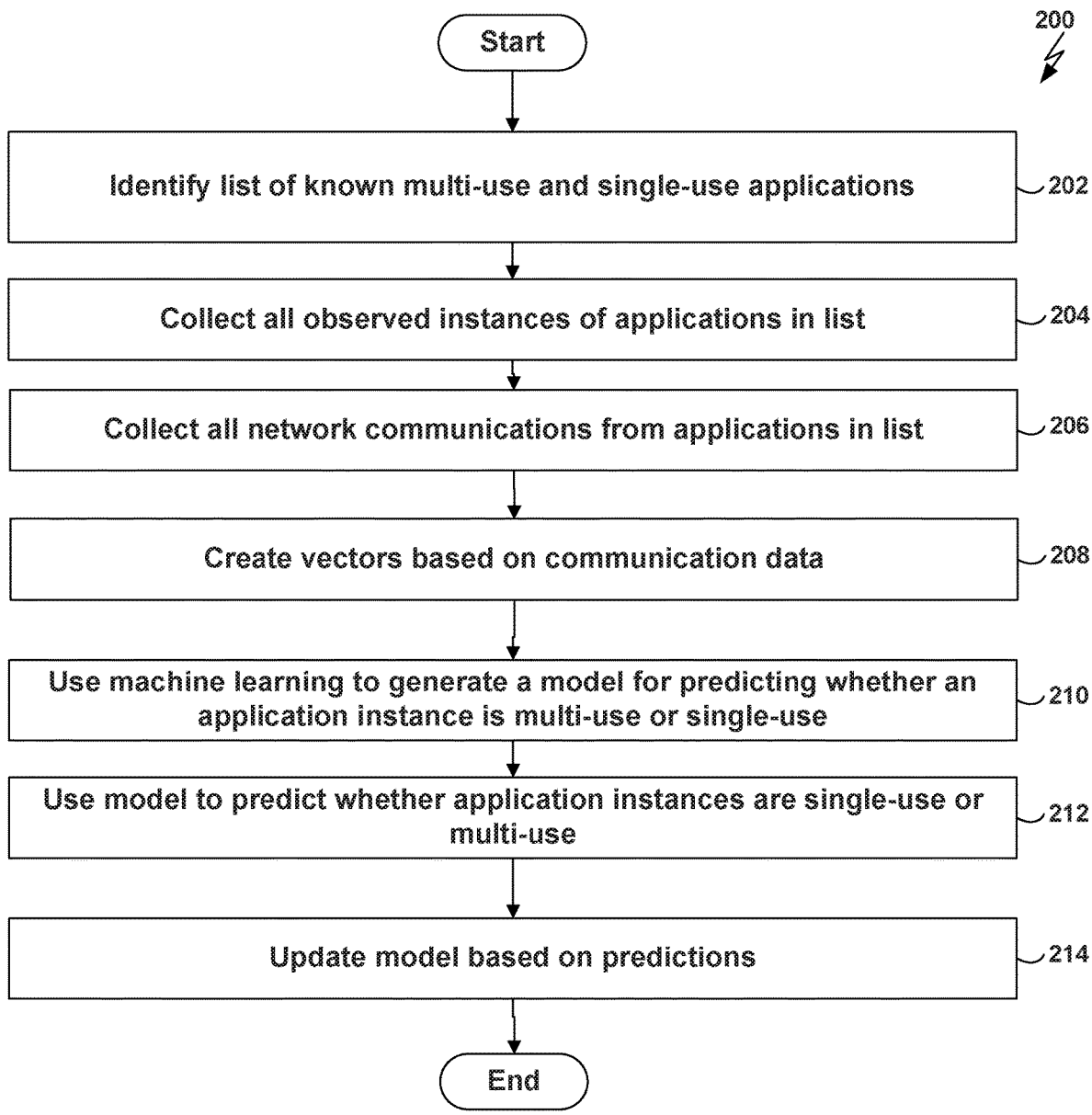
FIG. 2 is a flowchart of a method performed by the system according to one embodiment of the present invention.

Referring to FIG. 1A, a dataflow diagram is shown of a system 100 for automatically classifying multi-use applications on a network 102 according to one embodiment of the present invention. Referring to FIG. 2, a flowchart is shown of a method 200 performed by the system 100 according to one embodiment of the present invention.

The system 100 includes a plurality of application instances 104a-n, where n may be any number. The application instances 104a-n are executing on computers referred to herein as "hosts" (not shown) connected to the network 102. The application instances 104a-n are said herein to be executing "on" or "in" the network 102. As described in more detail in the Policy Enforcement Patent and the Policy Generation Patent, the application instances 104a-n may engage in a variety of communications with each other over the network 102, such as initiating connections with each other over the network 102 and sending messages to each other over the network 102.

In overview, the system 100 identifies (e.g., receives and/or generates) a list 106 of known multi-use applications (FIG. 2, operation 202). Some or all of the application instances 104a-n executing on the network 102 may be instances of applications that are specified as multi-use by the list 106. Some or all of the application instances 104a-n executing on the network 102 may be instances of applications that are not specified as multi-use by the list 106. As a specific example, at least one of the application instances 104a-n may be an instance of an application that is specified as multi-use by the list 106, and at least one of the application instances 104a-n may not be an instance of any application that is specified as multi-use by the list 106.

The list 106 may also identify one or more of the applications 104a-n as single-use applications. In other words, the list 106 may identify both applications that are known to be multi-use and applications that are known to be single-use. Some of the application instances 104a-n executing on the network 102 may be instances of applications that are specified as single-use by the list 106. Some or all of the application instances 104a-n executing on the network 102 may be instances of applications that are not specified as single-use by the list 106. As a specific example, at least one of the application instances 104a-n may be an instance of an application that is specified as single-use by the list 106, and at least one of the application instances 104a-n may not be an instance of any application that is specified as single-use by the list 106.

The list 106, also referred to herein as a "seed list," may be generated in any of a variety of ways (such as by being manually generated), and embodiments of the present invention are not limited to or dependent on any particular method of generating the list 106. For example, one or more human users may generate the list manually to specify one or more applications which are known to be multi-use and/or one or more applications which are known to be single-use. Because the system 100 and method 200 use the list 106 to (implicitly) define the distinction between multi-use and single-use, it is desirable for the list of multi-use applications in the list 106 to contain examples of various kinds of applications with multi-use behaviors. Similarly, it is desirable for the list of single-use applications in the list 106 to contain examples of as various kinds of applications with single-use behaviors as possible.

The system 100 includes an application instance collection module 108, which collects information about a plurality of application instances 104a-n executing on hosts on the network 102 (which may, include, for example, instances of applications in the list 106 and also instances of applications not in the list 106), and generates output 110 representing the collected information (FIG. 2, operation 204). The application instance collection module 108 may collect the application instance data and generate the output 110 in any of a variety of ways, such as in any of the ways disclosed in the Policy Enforcement Patent and the Policy Generation Patent. For example, as disclosed therein, agents may be installed on the hosts on which the application instances 104a-n are installed to collect information about which application instances and hosts are communicating with which other application instances and hosts. Although this information is gathered primarily to automatically generate network security policies and then to transmit those policies to the agents to enforce them, in embodiments of the present invention this gathered information may also be used to find applications and application instances, and to characterize the behavior of those applications and application instances in a fine-grained way, as described in more detail below. The application instance collection module 108 may, for example, collecting data about properties of application instances 104a-n executing on hosts on the network 102. Examples of such properties include, but are not limited to, filename, filepath, binary file size, version number, other kinds of meta-information about the file, and a hash of the application instance's binary file. The application instance collection module 108 may collect values of any such properties for each of a plurality of application instances 104a-n executing on hosts on the network 102 and store the collected values in the application instance data 110.

The system 100 also includes an application communication collection module 112, which collects information about network communications engaged in over the network 102 by application instances 104a-n executing on the network 102 (which may, include, for example, communications engaged in over the network 102 by instances of applications in the list 106 and also communications engaged in over the network 102 by instances of applications not in the list 106), and produces output 114 representing those communications (FIG. 2, operation 206). The application communication collection module 112 may collect the network communication information and generate the application communication output 114 in any of a variety of ways, such as in ways disclosed in the Policy Enforcement Patent and the Policy Generation Patent. Examples of information about each network communication that the application communication collection module 112 may collect and store in the application communication data 114 include, but are not limited to: source host identifier, source application instance identifier, source application operating context, source port, destination host identifier, destination application instance identifier, destination application operating context, destination port, and any of the other application fingerprint information disclosed herein.

The application communication output 114 may include data representing any number of communications over the network 102. Such output 114 may include, for example, data representing a plurality of communications from a particular source application instance and/or data representing a plurality of communications to a particular destination application instance. Such output 114 may include, for example, data representing communications from a plurality of source application instances and/or data representing communications to a plurality of destination application instances.

The system 100 also includes a vector creation module 116, which generates, for each of the observed application instances 110, vectors based on that application instance's communication data 114 (FIG. 2, operation 208). For example, as a prerequisite to the machine learning performed by the model generation module 120, the data representing communications engaged in by a single application instance may be represented as a vector. Those having ordinary skill in the art of machine learning will be familiar with a variety of ways to generate such a vector.

One approach, for example, is to collect, for each application instance X (e.g., each of the application instances 104a-n), the names associated with the application instances Y that application instance X has communicated with and, for each application instance Y, a count reflecting how often application instance X has communicated with application instance Y. Then each unique application name may be associated with a non-negative integer, perhaps assigned arbitrarily but densely in the range from 0 to N−1, assuming there are N distinct application names in the network 102. Then, a vector V is created, such that at the position P associated with application name A, the number of times X communicated with an application named A is stored at V[P], i.e., at position P (starting from 0) in the vector V.

The above is merely one example of information that may be stored in the vectors 118. Much more information is available to store in the vectors 118, such as any of the information disclosed in the Policy Enforcement Patent and the Policy Generation Patent.

The system 100 also includes a multi-use prediction model generation module 120, which receives the communication vectors 118 and application list 106 as inputs, and which learns a model 122 (e.g., using supervised machine learning) that predicts whether any particular application instance is single-use and/or multi-use (FIG. 2, operation 210). For example, once the data 114 from the application instances 104*a-n* are represented in the vectors 118, along with a label of "single-use" or "multi-use" for each one, the model generation module 120 may apply any of a variety of standard supervised machine learning algorithms to the vectors 118 to generate predictions about whether the corresponding application instances are instances of multi-use or single-use applications. This creates a model 122 that finds the most accurate way to predict one of the labels, given an arbitrary input vector.

Each such prediction may, for example: (1) solely predict whether the corresponding application instance is single-use, (2) solely predict whether the corresponding application instance is multi-use, or (3) predict whether the corresponding application instance is single-use and predict whether the corresponding application instance is multi-use. Each such prediction may for example, be represented by data which indicates the prediction (e.g., true/false) and, optionally, a confidence probability for the corresponding classification label (e.g., where examples of classification labels are single-use and multi-use).

Figure 1B:
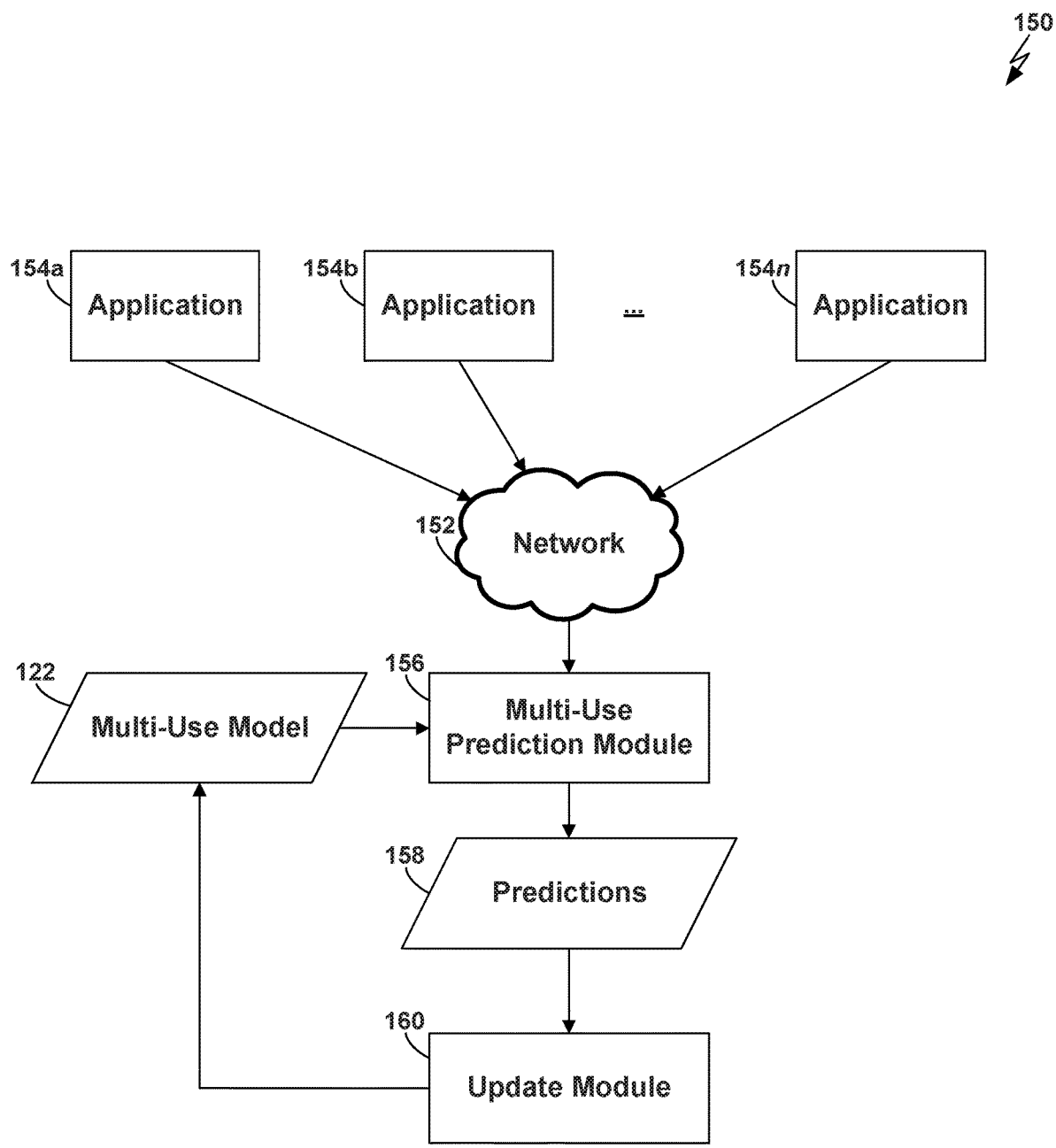
FIG. 1B is a dataflow diagram of a system for applying the model to applications on a network and for improving the model over time according to one embodiment of the present invention.

Referring to FIG. 1B, a dataflow diagram is shown of a system 150 for applying the model 122 to application instances executing on hosts on the network 102 and for improving the model 122 over time. The system 150 of FIG. 1B includes a network 152, which may, but need not be, the same as the network of FIG. 1A. Similarly, the system 150 of FIG. 1B includes a plurality of application instances 154*a-n*, which may, but need not be, the same as the application instances 102*a-n* in FIG. 1A.

The system 150 includes a multi-use prediction module 156, which may use the model 122 generated by the system 100 of FIG. 1A to predict whether one or more of the application instances 154*a-n* are single-use and/or multi-use (FIG. 2, operation 212). The prediction module 156 produces predictions 158 indicating whether individual application instances are multi-use or single use. For example, the prediction module 156 may predict whether application instances which were not part of the training data (i.e., applications not among the applications 104*a-n* in FIG. 1A) are single-use or multi-use.

Although when the model 122 is applied by the multi-use prediction module 156 to a particular application behavior, the corresponding one of the predictions 158 may simply contain either a label with a value of "multi-use" or "single use," alternatively the prediction may include both a "multi-use" label with a corresponding probability and a "single-use" label with a corresponding probability. The latter has a number of advantages in practice, including the ability to "tune" the multi-use assignment depending on a specific risk tolerance. Some algorithms output probabilities on their own; for others it can usually be calculated in other ways.

The system 150 also includes an update module 160, which checks the predictions 158 and feeds them back into the training and test data set. Such updated training and test data may be used to update the training of the model 122, thereby producing an updated version of the model 122 based on the predictions (FIG. 2, operation 214). Updating the model 122 in this way decreases the likelihood that mistakes (i.e., false positive and false negatives) will be repeated. New additions to the list 106 of known multi-use and single-use applications may be tested internally (and semi-automatically), to determine whether the predictions 158 were accurate. Alternatively, a prediction may be presented to the user for feedback. If the user disapproves of the prediction, the system 150 may incorporate the user's feedback into the training data to improve the model 122 by retraining it based on that feedback. Particular instantiations of this may combine these feedback steps, and use an instance of an "active learning" algorithm. However, this is not necessary, particularly if the feedback loops are unnecessary or minimal.

The model 122 may be used in two primary ways: to expand the seed list 106 to include other applications that we already know about (i.e., applications which were not originally included in the seed list 106), and to classify applications that weren't previous encountered (i.e., to add applications not among the applications to the seed list 106). In either case, the automatic assignment of "multi-use" or "single use" to application instances (in the predictions 158) may be performed in at least one of two ways. First, it is possible, especially with known applications (e.g., application instances 104*a-n*), that we can systematically test the model 122's output on a frequent basis, looking for mistakes. When a mistake is found, it can be corrected for use by the rest of the system, and the corrected information may be added to the seed list 106 and thus to the training data, so that after re-training the model 122, the mistake either will not be made again, or is at least much less likely to be made again.

As another example, the system 150 may provide output to a user indicating that a "multi-use" label has been predicted for a particular application instance. The user may then be allowed to provide input indicating whether to disable that application. Although the system 150 may not automatically assume the user's input is necessarily correct, after a certain amount of feedback (possibly in the form of A/B tests), if it has become clear that the model 122's label assignment is incorrect, then the system 150 may incorporate that feedback into the system 150 in the same way as the internal evaluation results.

Single-use software has limited capabilities with respect to how it communicates over a network. These limited capabilities make it more difficult to use maliciously, and hence such applications are safer. Therefore, we can make broader, more permissive policies for single-use software, with confidence the policies are still secure.

On the other hand, multi-use software has much broader capabilities to communicate with other applications over a network. Though not inherently dangerous, these applications may more easily be used maliciously. Therefore, for automatically generated policies to create a secure environment, the policies must be narrower, so that the multi-use software can only be used for its intended purpose.

One embodiment of the present invention is directed to a method for use with a plurality of known multi-use applications and a plurality of known single-use applications. The list 106 may, for example, contain data representing the plurality of known multi-use applications and the plurality of known single-use applications. As described above, however, the list 106 may solely contain data representing known multi-use applications; it need not also contain data representing known single-use applications.

The method may: (1) for each of the plurality of known multi-use applications: identify a plurality of observed instances of the multi-use application on a telecommunications network (such as by using the techniques disclosed above in connection with operation 204 in FIG. 2 and the application instance collection module 108 and application instance data 110 in FIG. 1A); store first data (e.g., the application instance data 110) representing the plurality of observed instances of the multi-use application; identify a plurality of communications of the plurality of observed instances of the multi-use application on the telecommunications network (such as by using the techniques disclosed above in connection with operation 206 in FIG. 2 and the application communication collection module 112 and the application communication data 114 in FIG. 1A); and store second data (e.g., the application communication data 114) representing the plurality of communications of the plurality of observed instances of the multi-use application on the telecommunications network.

The method may also: (2) for each of the plurality of known single-use applications: identify a plurality of observed instances of the single-use application on the telecommunications network (such as by using the techniques disclosed above in connection with operation 204 in FIG. 2 and the application instance collection module 108 and application instance data 110 in FIG. 1A); store third data (e.g., the application instance data 110) representing the plurality of observed instance of the multi-use application; identify a plurality of communications of the plurality of observed instances of the single-use application on the telecommunications network (such as by using the techniques disclosed above in connection with operation 206 in FIG. 2 and the application communication collection module 112 and the application communication data 114 in FIG. 1A); and store fourth data (e.g., the application communication data 114) representing the plurality of communications of the plurality of observed instances of the multi-use application on the telecommunications network.

The method may also: (3) generate, based on the first data, second data, third data, and fourth data, a model (e.g., the model 122) that predicts whether an application instance is an instance of a multi-use application (such as by using the techniques disclosed above in connection with operation 210 in FIG. 2 and the model generation module 120 and the multi-use model 122 in FIG. 1A).

Once the model has been generated, the method may further: (4) generate a prediction, using the model, of whether a particular application instance is an instance of a multi-use application. The particular application for which the prediction is made may, for example, be an instance of one of the plurality of known multi-use applications or an instance of one of the plurality of known single-use applications that were used to train the model. Alternatively, for example, the particular application for which the prediction is made may not be an instance of any of the plurality of known multi-use applications that were used to train the model and may not be an instance of any of the plurality of known single-use applications that were used to train the model. In other words, the model may be used to generate a prediction of whether a previously-unknown application is a multi-use application or a single-use application.

Once the prediction has been generated, the method may further: (5) obtaining input indicating whether the prediction is correct; and (6) updating the model based on the input indicating whether the prediction is correct. The input may, for example, be received from a user. For example, the method may provide output specifying the particular application instance (such as application fingerprint output including data representing one or more features of the application instance, such as one or more of its name, filename, version number, and vendor). The user may evaluate the output to determine whether the prediction is correct, and then provide the input indicating whether the prediction is correct.

Generating the prediction of whether the particular application is an instance of a multi-use application may include, for example: (4) (a) automatically generating data representing the particular application instance; and (4) (b) generating a prediction, using the model, of whether the particular application instance is single-use or multi-use. For example, the method may use machine learning to generate the data representing the particular application instance, where the particular application instance may or may not be among the plurality of known multi-use applications and the particular application instance may or may not be among the plurality of known single-use applications.

The model may be generated to be capable of predicting whether an application instance is an instance of a single-use application. In other words, the model may be generated to be capable of predicting whether an application instance is an instance of a single-use application or whether the application instance is an instance of a single-use application. As a result, generating the prediction may include generating the prediction, using the model, of whether a particular application instance is an instance of a single-use application.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically collect information about communications between networked applications. Such collection can only be performed by computer systems and not by humans. Furthermore, embodiments of the present invention can generate a network communication model by collecting and processing very large volumes of data, such as billions of matches, which would be impossible for a human to perform. For at least these reasons, embodiments of the present invention are inherently directed to computer-implemented systems and methods. Furthermore, embodiments of the present invention are directed to a problem—namely, improving security of networked communications between computer applications—which is inherently rooted in computer and Internet technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method for use with a plurality of known multi-use applications and a plurality of known single-use applications, the method performed by at least one computer processor executing computer program instructions stored in at least one non-transitory computer-readable medium, the method comprising:
   (1) for each of the plurality of known multi-use applications:
      identifying a plurality of observed instances of the multi-use application on a telecommunications network, each multi-use application is configured for arbitrary communications on the telecommunications network;
      storing first data representing the plurality of observed instances of the multi-use application;
      identifying a plurality of communications of the plurality of observed instances of the multi-use application on the telecommunications network; and
      storing second data representing the plurality of communications of the plurality of observed instances of the multi-use application on the telecommunications network
   (2) for each of the plurality of known single-use applications:
      identifying a plurality of observed instances of the single-use application on the telecommunications network, each single-use application is configured for limited communications over the telecommunications network relative to the multi-use applications;
      storing third data representing the plurality of observed instance of the multi-use application;
      identifying a plurality of communications of the plurality of observed instances of the single-use application on the telecommunications network; and
      storing fourth data representing the plurality of communications of the plurality of observed instances of the multi-use application on the telecommunications network;
   (3) generating, based on the first data, second data, third data, and fourth data, a model that predicts whether an application instance is an instance of a multi-use application; and
   (4) generating a prediction, using the model, of whether a particular application instance is an instance of a multi-use application, and, based on the prediction, applying security policies on the particular application such that the multi-use application has narrower policies than any single-use application.

2. The method of claim 1, wherein the particular application instance is one of an instance of one of the plurality of known multi-use applications and an instance of one of the plurality of known single-use applications.

3. The method of claim 1, wherein the particular application instance is not an instance of any of the plurality of known multi-use applications and is not an instance of any of the plurality of known single-use applications.

4. The method of claim 1, further comprising:
(5) obtaining input indicating whether the prediction is correct; and
(6) updating the model based on the input indicating whether the prediction is correct.

5. The method of claim 4, wherein (5) comprises obtaining the input indicating whether the prediction is correct from a user.

6. The method of claim 1, wherein (4) comprises:
(4)(a) automatically generating data representing the particular application instance; and
(4)(b) generating a prediction, using the model, of whether the particular application instance is single-use or multi-use.

7. The method of claim 1, wherein the model further predicts whether an application instance is an instance of a single-use application, and wherein the method further comprises:
(4) generating a prediction, using the model, of whether a particular application instance is an instance of a single-use application.

8. A system for use with a plurality of known multi-use applications and a plurality of known single-use applications, the system including at least one non-transitory computer-readable medium having computer program instructions stored thereon, the computer program instructions being executable by at least one processor to perform steps of:
(1) for each of the plurality of known multi-use applications:
identifying a plurality of observed instances of the multi-use application on a telecommunications network, each multi-use application is configured for arbitrary communications on the telecommunications network;
storing first data representing the plurality of observed instances of the multi-use application;
identifying a plurality of communications of the plurality of observed instances of the multi-use application on the telecommunications network; and
storing second data representing the plurality of communications of the plurality of observed instances of the multi-use application on the telecommunications network
(2) for each of the plurality of known single-use applications:
identifying a plurality of observed instances of the single-use application on the telecommunications network, each single-use application is configured for limited communications over the telecommunications network relative to the multi-use applications;
storing third data representing the plurality of observed instance of the multi-use application;
identifying a plurality of communications of the plurality of observed instances of the single-use application on the telecommunications network; and
storing fourth data representing the plurality of communications of the plurality of observed instances of the multi-use application on the telecommunications network; and
(3) generating, based on the first data, second data, third data, and fourth data, a model that predicts whether an application instance is an instance of a multi-use application for application of security policies thereon such that the multi-use application has narrower policies than any single-use application; and
(4) generating a prediction, using the model, of whether a particular application instance is an instance of a multi-use application, and, based on the prediction, applying security policies on the particular application such that the multi-use application has narrower policies than any single-use application.

9. The system of claim 8, wherein the particular application instance is one of an instance of one of the plurality of known multi-use applications and an instance of one of the plurality of known single-use applications.

10. The system of claim 8, wherein the particular application instance is not an instance of any of the plurality of known multi-use applications and is not an instance of any of the plurality of known single-use applications.

11. The system of claim 8, wherein the steps further include:
(5) obtaining input indicating whether the prediction is correct; and
(6) updating the model based on the input indicating whether the prediction is correct.

12. The system of claim 11, wherein (5) comprises obtaining the input indicating whether the prediction is correct from a user.

13. The system of claim 8, wherein (4) comprises:
(4)(a) automatically generating data representing the particular application instance; and
(4)(b) generating a prediction, using the model, of whether the particular application instance is single-use or multi-use.

14. The system of claim 8, wherein the model further predicts whether an application instance is an instance of a single-use application, and wherein the steps further include:
(4) generating a prediction, using the model, of whether a particular application instance is an instance of a single-use application.

* * * * *